INVENTOR
*Walter Koidan*

BY *David Gobbins*
*John C. Stahl* ATTORNEYS

INVENTOR
Walter Koidan

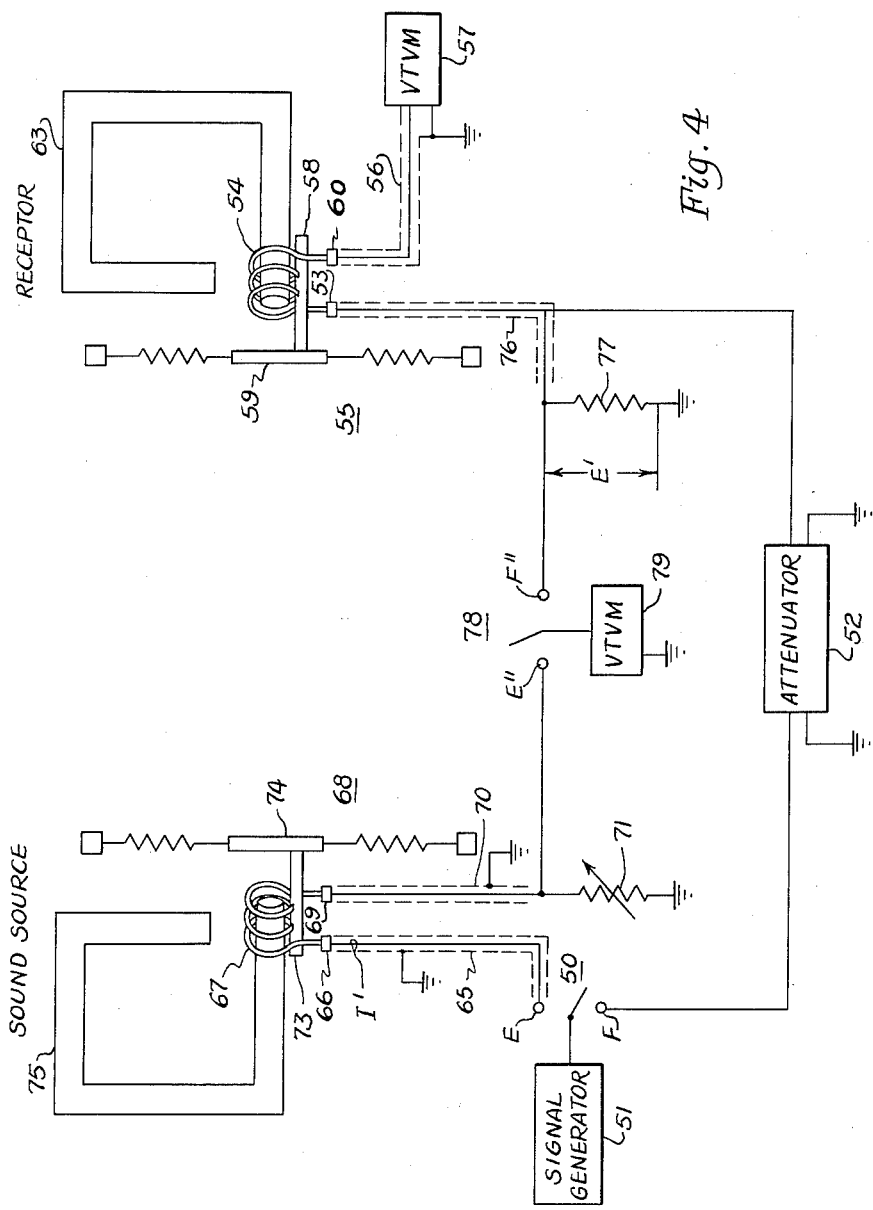

United States Patent Office 3,054,864
Patented Sept. 18, 1962

3,054,864
INSTRUMENT FOR RECIPROCITY CALIBRATION OF ELECTROACOUSTIC TRANSDUCERS
Walter Koidan, Washington, D.C., assignor to the United States of America as represented by the Secretary of Commerce
Filed Nov. 30, 1960, Ser. No. 72,803
4 Claims. (Cl. 179—175.1)

This invention relates to a reciprocity calibration instrument for an electroacoustic transducer and in particular to an instrument for measuring the ratio of the open-circuit voltage of the receptor transducer to the driving current through the sound source transducer.

In one arrangement in the prior art used in the reciprocity calibration of a microphone, the ratio of the open-circuit voltage of the receptor microphone to the driving voltage on a source microphone is measured, then the impedance of the source microphone is determined on a bridge. From these two measurements the ratio of the open-circuit voltage of the receptor microphone to the driving current through the source microphone is calculated. This arrangement has the disadvantage that in addition to the calculation it requires two readings on two separate instruments.

Accordingly, it is an object of the present invention to provide an instrument with which the desired ratio may be obtained by a direct reading of the value of an impedance element.

This is accomplished by providing an instrument in which the open-circuit voltage of the receptor electroacoustic transducer is measured and an impedance element, connected to the sound source electroacoustic transducer, through which the driving current flows, is adjusted so that the open-circuit voltage appears across the impedance element. If the latter is a resistor, the value of the resistance R is equal to the desired ratio, that is:

$$R = \frac{E'}{I'}$$

where:
$E'$=open-circuit voltage of the receptor microphone
$I'$=driving current through the microphone under test.

Figure 1:
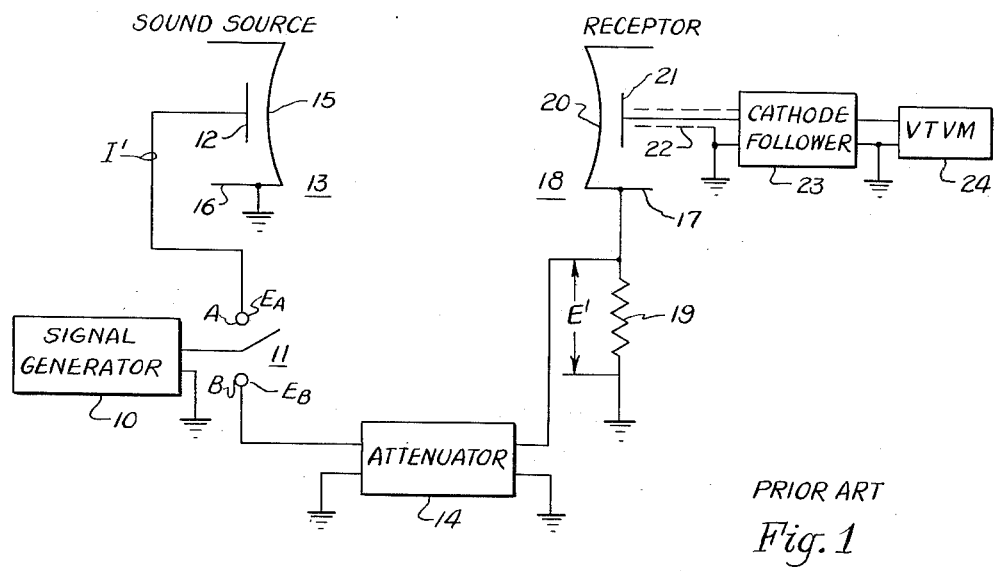
Figure 2:
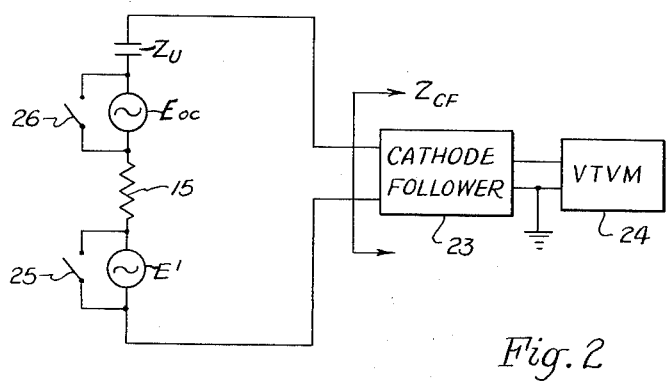
Figure 3:
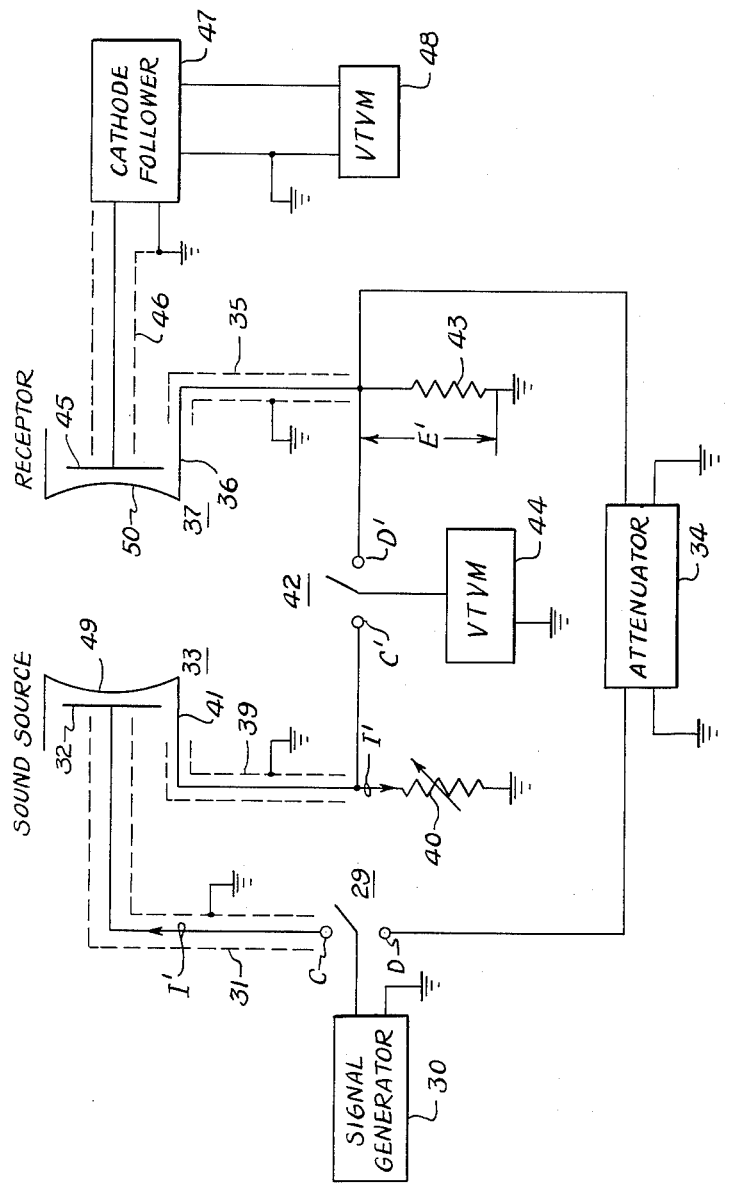

In the figures:
FIG. 1 is an instrument used in the prior art for the reciprocity calibration of a microphone;
FIG. 2 is an equivalent diagram for explaining the operation of the instrument in FIG. 1 and the embodiments in FIG. 3 and 4;
FIG. 3 is one embodiment;
FIG. 4 is a second embodiment of the present invention.

Referring to FIG. 1, polarizing-voltage supplies and blocking capacitors have been omitted from the diagram for clarity. Signal generator 10 is applied through contact A of switch 11 to back plate 12 of microphone 13, which functions as the sound source, or through contact B to variable antenuator 14. Diaphragm 15 is grounded through shell 16. The output of the antenuator is applied to shell 17 of microphone 18, which functions as a receptor, and across resistor 19 to ground. Voltages $E'$, $E_A$ and $E_B$ appear across resistor 19 and on contacts A, B, respectively. Finally the output of microphone 18, which is dependent upon the pressure exerted on diaphragm 20, is applied through back plate 21, shielded cable 22 and cathode follower 23 to vacuum tube voltmeter 24.

In using the arrangement in FIG. 1 for determining the ratio $$\left|\frac{E'}{I'}\right|$$

where $I'$ is the driving current through microphone 13 and $E'$ is the open-circuit voltage of microphone 18: the blade of switch 11 is positioned to engage contact A so that microphone 13 generates a sound which is received by microphone 18. The reading on vacuum tube voltmeter 24 is noted. Then the blade of switch 11 is positioned to engage contact B and a signal is applied through antenuator 14 to microphone 18. The antenuator is adjusted so that the voltmeter indicates the reading noted in the preceding step.

If $E_A = E_B$, then:

$$A = \frac{E_B}{E'} = \frac{E_A}{E'} \quad (1)$$

where: $E'$=open-circuit voltage of microphone 18 and $A$=attenuator reading.

That E' is equal to the open-circuit voltage of microphone 18 is readily apparent from a consideration of FIG. 2 where $Z_U$ is the electrical impedance of microphone 18 and $Z_{CF}$ is the input impedance of cathode follower 23. When the blade of switch 11 in FIG. 1 engages contact A, switch 25 in FIG. 2 is closed and switch 26 is open. The circuit thus represents the condition under which open circuit voltage $E_{OC}$ is generated by microphone 18. When the blade engages contact B, switch 26 is closed, switch 25 is open, and voltage E' is applied in series with the microphone. Since voltmeter 24 reads the same in both positions of the switch, E' is equal to the open-circuit voltage of the microphone 18.

To determine the desired ratio $$\frac{E'}{I'}$$

the impedance of microphone 13 is measured on a suitable instrument such as a Shering bridge, and the following calculations are performed:

$$Z_U = \frac{E_A}{I'}$$

$$E_A = Z_U I'$$

From Equation 1:

$$E_A = AE'$$

Thus:

$$\frac{E'}{I'} = \frac{Z_U}{A}$$

Referring to FIG. 3, polarizing-voltage supplies and blocking capacitors have again been omitted from the diagram for clarity. When the blade of switch 29 engages terminal C, signal generator 30 is applied through shielded calibrating line 31 to back plate 32 of microphone 33, which functions as a sound source; and when the blade engages contact D the signal generator is applied through variable attenuator 34 and shielded calibrating line 35 to shell 36 of receptor microphone 37. Line 35 also connects resistor 43 between shell 36 and ground while shielded calibrating line 39 connects variable resistor 40, a calibrated decade resistance box, between ground and shell 41. Other types of precision impedance elements such as a bank of capacitors could, of course, be used instead of variable resistor 40. The shielded lines 35, 39, whose shields are grounded, insure that the current through resistor 40 is the same as that through microphone 33. When the blade of switch 42 engages contact C' the voltage appearing across variable resistor 40 is applied to vacuum tube voltmeter 44 and when the blade of the switch engages contact D' the voltage appearing across resistor 43 is applied to the vacuum tube voltmeter. Switches 29, 42 may be ganged for convenience. Finally, the back plate 45 of microphone 37 is connected through shielded cable 46 and cathode follower 47 to vacuum tube voltmeter 48. When the blade of switch 29 engages contact D, the vacuum tube voltmeter provides a reading that is proportional to the input voltage of cathode follower 47 which in turn is dependent upon voltage E'. When the blade engages contact C, the voltmeter provides a reading dependent upon the open-circuit voltage generated by microphone 37. These readings are dependent upon their associated voltages in exactly the same way, and in the reciprocity calibration set forth below voltage E' is equal to the open-circuit voltage.

Microphones 33, 37 are positioned so that the sound emitted from diaphragm 49, applies pressure to diaphragm 50. The acoustic coupling between the two transducers can consist of a small closed chamber, not shown, or free space.

In utilizing the embodiment disclosed in FIG. 3 to measure the ratio $$\left|\frac{E'}{I'}\right|$$

in a reciprocity calibration, the following adjustments are made:

First, attenuator 34 is adjusted so that vacuum tube voltmeter 48 reads the same value when the blade of switch 29 engages contacts C or D. Voltage E', which appears across resistor 43, is then equal in magnitude to the open-circuit voltage of receptor microphone 37.

Secondly, variable resistor 40 is adjusted so that vacuum tube voltmeter 44 reads the same value in both positions of switches 29, 42. The voltage across resistor 40 is then equal to |E'|, and the value of the resistance is equal to:

$$\left|\frac{E'}{I'}\right| \quad (2)$$

Adjusting resistor 40 changes the open-circuit voltage appearing across microphone 37, but does not change the value of E'.

The first and second steps indicated above are then repeated. After the second adjustment of resistor 40, the value of voltage E' is closer to that of the open-circuit voltage of microphone 37. The steps may be repeated until voltage E' is as close to the open-circuit voltage as desired. In the limit, i.e., after an infinite number of repetitions of the first and second steps, the value of voltage E' equals the open-circuit voltage of microphone 37 and Expression 2 is the desired ratio.

This result is independent of the reading of attenuator 34, which need not be calibrated; and the output of signal generator 30 can vary with the position of switch 29 without affecting the results of the measurement.

After the first and second steps have been performed the desired number of times, it can be shown by mathematical analysis of the structure in FIG. 3 that for $$\left|\frac{E'}{I'}\right|$$

to be equal to the desired ratio, the magnitude of the final value of variable resistor 40 must be less than the magnitude of the impedance of microphone 33. This is equivalent to stating that the open-circuit voltage of microphone 37 must be less than the driving voltage on microphone 33. In practice, the final value of resistor 40 is very much smaller than the magnitude of the impedance of microphone 33 and it is necessary to perform the first and second steps only once, i.e., only one adjustment of attenuator 34 and resistor 40 will be required.

Referring to FIG. 4, when switch 50 engages terminal F signal generator 51 is applied through attenuator 52 and terminal 53 to one side of coil 54 of electrodynamic microphone 55. The other side of the coil is connected through terminal 60 and shielded cable 56 to vacuum tube voltmeter 57. Coil 54 is mounted on movable arm 58 which is attached to diaphragm 59. One side of magnetic yoke 63 is positioned in coil 54 so that pressure on diaphragm 59, moving the coil, induces a voltage therein which is applied through terminal 60 and shielded cable 56 to vacuum tube voltmeter 57.

When the blade of switch 50 engages contact E, the voltage generated in coil 54 is the open-circuit voltage of microphone 55, and vacuum tube voltmeter 57 provides an indication dependent upon this voltage. When the blade engages terminal F, the vacuum tube voltmeter provides a reading dependent upon voltage E'. The two readings are dependent upon their associated voltages in exactly the same way, and in the reciprocity calibration described above voltage E' is equal to the open-circuit voltage.

When the blade of switch 50 engages terminal E, current I' flows through shielded calibration cable 65, terminal 66, coil 67 of microphone 68, terminal 69, shielded calibration cable 70, and variable resistor 71 to ground. Resistor 71 is a calibrated decade resistance box, but, of course, may be one of a variety of types of precision impedance elements. Coil 67 is mounted on movable arm 73 which is attached to diaphragm 74 of microphone 68. One side of magnetic yoke 75 is positioned in coil 67 so that current through coil 67 exerts pressure on diaphragm 74. Shielded and grounded calibration line 76 connects resistor 77 between terminal 53 and ground so that voltage E' appears across the resistor. When the blade of switch 78 engages terminal F" the voltage appearing across resistor 77 is read by vacuum tube voltmeter 79 and when the blade engages terminal E" the voltage appearing across variable resistor 71 is read by the vacuum tube voltmeter. Switches 50, 78 may be ganged for convenience.

When utilizing the embodiment disclosed in FIG. 4 to measure the ratio $$\left|\frac{E'}{I'}\right|$$

in a reciprocity calibration, the same steps indicated above in connection with FIG. 3 are followed to obtain essentially the same results.

From the foregoing it is seen that in using the system in the prior art for obtaining the desired ratio, it is necessary to measure the open-circuit voltage of the microphone with the arrangement shown in FIG. 1, measure the impedance of the microphone by a separate measurement and then perform the indicated calculation. Thus, two instruments and a calculation are required. In contrast, when using the embodiments in FIGS. 3 and 4, after the steps indicated are performed, a direct reading of the desired ratio is obtained on variable resistors 40 and 71, respectively.

Obviously, many modifications and variations of the present invention are possible in the light of the above teachings. It is therefore to be understood, that within the scope of appendent claims, the invention may be practiced otherwise than as specifically described.

What is claimed is:

1. A microphone calibration instrument comprising: a first microphone including a driven element, a signal generator, a variable attenuator, means for selectively applying the output of said signal generator to the driven element of said first microphone or to the input of said attenuator, a variable impedance element connected between the driven element of said first microphone and ground, a second microphone including a driven element, said first microphone being coupled acoustically to the second microphone so that a signal applied to said first microphone will result in the generation of an open-circuit voltage by the second microphone, means for applying the output of said attenuator to the driven element of said second microphone, an impedance element connected between the driven element of said second microphone and ground, means connected to said second microphone for providing an indication dependent upon the open-circuit voltage generated by said second microphone, means for selectively measuring the voltage appearing across said variable impedance element or across said impedance element, and means for adjusting said variable impedance element so that the voltage appearing thereacross is equal in magnitude to the voltage appearing across said impedance element.

2. A microphone calibration instrument comprising: a first electrostatic microphone including a diaphragm, a signal generator, a variable attenuator, means for selectively applying the output of said signal generator to said first microphone or to the input of said attenuator, a variable impedance element connected between the diaphragm of said first microphone and ground, a second electrostatic microphone including a diaphragm, said first microphone being coupled acoustically to the second microphone so that a signal applied to said first microphone will result in the generation of an open-circuit voltage by the second microphone, means for applying the output of said attenuator to the diaphragm of said second microphone, an impedance element connected between the diaphragm of said second microphone and ground, means connected to said second microphone for providing an indication dependent upon the open-circuit voltage generated by said second microphone, means for selectively measuring the voltage appearing across said variable impedance element or across said impedance element, and means for adjusting said variable impedance element so that the voltage appearing thereacross is equal in magnitude to the voltage appearing across said impedance element.

3. A microphone calibration instrument comprising: a first and second electrodynamic microphone, each including a coil having a first and second end and mounted on a movable arm and around an end of a magnetic yoke, each movable arm being attached to a diaphragm, said first microphone being coupled acoustically to the second microphone so that a signal applied to said first microphone will result in the generation of an open-circuit voltage by the second microphone, a signal generator, a variable attenuator, means for selectively applying the output of said signal generator to the first end of the coil of said first microphone or to the input of said variable attenuator, a variable impedance element connected between the second end of the coil of said first microphone and ground, means for applying the output of said attenuator to the first end of the coil of said second microphone, an impedance element connected between said first end of the coil of the second microphone and ground, means connected to the second end of the coil of said second microphone for providing an indication dependent upon the open-circuit voltage generated by said second microphone, means for selectively measuring the voltage appearing across said variable impedance element or across said impedance element, and means for adjusting said variable impedance element so that the voltage appearing thereacross is equal in magnitude to the voltage appearing across said impedance element.

4. A microphone calibration instrument comprising: a first and second microphone, said first microphone being coupled acoustically to the said second microphone so that a signal applied to said first microphone will result in the generation of an open-circuit voltage by the second microphone, a variable impedance element connected to said first microphone in such a manner that the driving current of said first microphone passes through said variable impedance element, a second impedance element connected in series with said second microphone, a signal generator, means for selectively applying the output of said signal generator to said first microphone, indicating means connected to said second microphone for providing an indication dependent upon the open-circuit voltage of the second microphone, means for selectively applying a voltage across said second impedance element having a magnitude such that said indicating means indicates the same value as when the output of said signal generator is applied to said first microphone, and means for selectively measuring the voltage appearing across said variable impedance element or across said second impedance element.

References Cited in the file of this patent

UNITED STATES PATENTS 2,530,383   Estes _____ Nov. 21, 1950

OTHER REFERENCES

Magazine article Acustica 2, pp. 112–118, 1952, "A Simplified Technique for the Pressure Calibration of Condenser Microphones by the Reciprocity Method," A. K. Nielsen.